US010388426B2

(12) United States Patent
Reul et al.

(10) Patent No.: US 10,388,426 B2
(45) Date of Patent: Aug. 20, 2019

(54) PANE HAVING AN ELECTRICAL CONNECTION ELEMENT AND A FLEXIBLE CONNECTION CABLE

(71) Applicant: SAINT-GOBAIN GLASS FRANCE, Courbevoie (FR)

(72) Inventors: Bernhard Reul, Herzogenrath (DE); Mitja Rateiczak, Wuerselen (DE); Klaus Schmalbuch, Goult (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 32 days.

(21) Appl. No.: 15/529,071

(22) PCT Filed: Nov. 10, 2015

(86) PCT No.: PCT/EP2015/076186
§ 371 (c)(1),
(2) Date: May 23, 2017

(87) PCT Pub. No.: WO2016/096248
PCT Pub. Date: Jun. 23, 2016

(65) Prior Publication Data
US 2018/0330845 A1 Nov. 15, 2018

(30) Foreign Application Priority Data
Dec. 16, 2014 (EP) .................. 14198186

(51) Int. Cl.
*H01R 4/02* (2006.01)
*H01B 7/02* (2006.01)
(Continued)

(52) U.S. Cl.
CPC ............ *H01B 7/0216* (2013.01); *H01B 7/04* (2013.01); *H01B 7/1895* (2013.01); *H01B 7/40* (2013.01);
(Continued)

(58) Field of Classification Search
CPC . H01R 12/585; H01R 12/707; H01R 43/0256
(Continued)

(56) References Cited

U.S. PATENT DOCUMENTS 2,644,066 A  6/1953 Glynn
4,454,378 A  6/1984 Neuroth
(Continued)

FOREIGN PATENT DOCUMENTS

DE  3344091 A1  6/1984
DE  9013380 U1  11/1990
(Continued)

OTHER PUBLICATIONS

International Search Report issued for International Application No. PCT/EP2015/055007 filed on Mar. 11, 2015 on behalf of Saint-Gobain Glass France, dated Jun. 8, 2015. 4 pages (English translation + German original).
(Continued)

*Primary Examiner* — Phuong K Dinh
(74) *Attorney, Agent, or Firm* — Pillsbury Winthrop Shaw Pittman LLP

(57) ABSTRACT

A pane with at least one electrical connection element is described. The pane having at least a substrate, an electrically conductive structure on a region of the substrate, a connection element that is connected via a soldering compound to a region of the electrically conductive structure, and a flexible connection cable connected to the connection element. The connection cable is provided with a stiffening element and the connection cable with the stiffening element is enshrouded by a heat shrink tube.

24 Claims, 4 Drawing Sheets

(51) Int. Cl.

| | | |
|---|---|---|
| *H05B 3/84* | (2006.01) | |
| *H01B 7/04* | (2006.01) | |
| *H01B 7/18* | (2006.01) | |
| *H01B 7/40* | (2006.01) | |
| *H01R 4/18* | (2006.01) | |
| *H01R 4/58* | (2006.01) | |
| *H01R 4/72* | (2006.01) | |
| *H05B 3/06* | (2006.01) | |
| *B60R 16/02* | (2006.01) | |
| *H01B 7/08* | (2006.01) | |
| *H01R 12/62* | (2011.01) | |

(52) U.S. Cl.
CPC ............. *H01R 4/029* (2013.01); *H01R 4/187* (2013.01); *H01R 4/58* (2013.01); *H01R 4/72* (2013.01); *H05B 3/06* (2013.01); *H05B 3/84* (2013.01); *B60R 16/02* (2013.01); *H01B 7/08* (2013.01); *H01R 4/183* (2013.01); *H01R 12/62* (2013.01); *H05B 2203/016* (2013.01)

(58) Field of Classification Search
USPC ......................................................... 439/876
See application file for complete search history.

(56) References Cited

U.S. PATENT DOCUMENTS

| | | | | |
|---|---|---|---|---|
| 5,738,554 | A * | 4/1998 | Borger | ................ H01R 4/02 219/203 |
| 9,635,758 | B2 | 4/2017 | Schmalbuch et al. | |
| 9,967,967 | B2 * | 5/2018 | Schmalbuch | .......... H01R 12/53 |
| 2004/0048524 | A1 | 3/2004 | Yuasa et al. | |
| 2005/0112291 | A1 | 5/2005 | Okajima et al. | |
| 2007/0224842 | A1 | 9/2007 | Hoepfner et al. | |
| 2010/0285685 | A1 | 11/2010 | Ziegler et al. | |
| 2012/0067641 | A1 | 3/2012 | Tokiwa et al. | |
| 2014/0182932 | A1 | 7/2014 | Cholewa et al. | |
| 2015/0264800 | A1 | 9/2015 | Schmalbuch et al. | |
| 2015/0296615 | A1 | 10/2015 | Schmalbuch et al. | |
| 2016/0240935 | A1 | 8/2016 | Katakura | |
| 2017/0033481 | A1 | 2/2017 | Schmalbuch et al. | |
| 2018/0083339 | A1 | 3/2018 | Werner et al. | |

FOREIGN PATENT DOCUMENTS

| | | | |
|---|---|---|---|
| DE | 4439645 | C1 | 4/1996 |
| DE | 10338297 | A1 | 6/2004 |
| DE | 202013006781 | U1 | 8/2013 |
| DE | 202013006775 | U1 | 9/2013 |
| EP | 0477069 | A2 | 3/1992 |
| EP | 1488972 | A1 | 12/2004 |
| EP | 2361450 | A1 | 8/2011 |
| JP | S565394 | U | 1/1981 |
| JP | 2004189023 | A | 7/2004 |
| JP | 2010539661 | A | 12/2010 |
| JP | H06290855 | A | 3/2015 |
| JP | 2015069893 | A | 4/2015 |
| KR | 101077081 | B1 | 10/2011 |
| WO | 2008/137946 | A1 | 11/2008 |
| WO | 2010/057641 | A1 | 5/2010 |
| WO | 2012/152543 | A1 | 11/2012 |
| WO | 2014/079594 | A1 | 5/2014 |
| WO | 2015/165632 | A1 | 11/2015 |
| WO | 2016/177653 | A1 | 11/2016 |

OTHER PUBLICATIONS

International Search Report issued for International Application No. PCT/EP2016/059716 filed on May 1, 2016 on behalf of Saint-Gobain Glass France, dated Jul. 22, 2016. 6 pages (English translation + German original).

Final Office Action issued for U.S. Appl. No. 15/303,729, filed Oct. 12, 2016 on behalf of Saint-Gobain Glass France, dated Aug. 23, 2018. 22 pages.

Non-Final Office Action issued for U.S. Appl. No. 15/303,729, filed Oct. 12, 2016 on behalf of Saint-Gobain Glass France, dated Apr. 5, 2018. 19 pages.

Written Opinion for PCT Application No. PCT/EP2015/055007 filed on Mar. 11, 2015 on behalf of Saint-Gobain Glass France, dated Jun. 8, 2015. 15 pages (German original + English translation).

Written Opinion for International Application No. PCT/EP2015/076186 filed on Nov. 11, 2015 on behalf of Saint-Gobain Glass France, dated Feb. 5, 2016. 11 pages (English translation + German original).

Written Opinion issued for International Application No. PCT/EP2016/059716 filed on May 1, 2016 on behalf of Saint-Gobain Glass France, dated Jul. 22, 2016. 15 pages (English translation + German original).

International Search Report for International Application No. PCT/EP2015/076186 filed on Nov. 10, 2015 in the name of Saint-Gobain Glass France. (English translation and German original) dated May 2, 2016. 4 pages.

International Preliminary Report on Patentability for International Application No. PCT/EP2015/055007 filed Mar. 11, 2015 on behalf of Saint-Gobain Glass France, dated Nov. 1, 2016. 9 pages (English Translation).

International Preliminary Report on Patentability for International Application No. PCT/EP2015/076186 filed Nov. 10, 2015 on behalf of Saint-Gobain Glass France, dated Jun. 20, 2017. 6 pages (English Translation).

International Preliminary Report on Patentability for International Application No. PCT/EP2016/059716 filed May 1, 2016 on behalf of Saint-Gobain Glass France, dated Nov. 7, 2017. 7 pages (English Translation).

Notice of Allowance for U.S. Appl. No. 15/303,729, filed Oct. 12, 2016, on behalf of Saint-Gobain Glass France, dated Dec. 4, 2018. 9 pages.

* cited by examiner

PANE HAVING AN ELECTRICAL CONNECTION ELEMENT AND A FLEXIBLE CONNECTION CABLE

CROSS REFERENCE TO RELATED APPLICATIONS

The present application is the U.S. national stage entry of International Patent Application No. PCT/EP2015/076186, filed internationally on Nov. 10, 2015, which, in turn, claims priority to European Patent Application No. 14198186.0, filed on Dec. 16, 2014.

BACKGROUND OF THE INVENTION

The invention relates to a pane with an electrical connection element and a flexible connection cable, a method for its production, as well as its use.

The invention further relates to a pane with an electrical connection element for vehicles with electrically conductive structures such as, for example, heating conductors or antenna conductors. The electrically conductive structures are customarily provided with soldered-on electrical connection elements that are connected to the vehicle's electrical system via connection cables.

The connection cables to the vehicle's electrical system are typically not connected directly to the connection elements. Instead, the connection elements are provided with comparatively short connection parts that are customarily equipped with a plug connector. The panes can be produced prefabricated with the connection elements along with connection parts. At the time of installation in the vehicle body, the connection parts of the connection elements can then be connected to the vehicle's electrical system very simply and time-savingly with the connection cables, in particular, by means of a plug connection.

The connection part can be a stiff element. One example of a stiff connection part with a plug connector is known from EP 1488972 A1—however, numerous other designs are conceivable. The advantage of a stiff connection part resides in the capability of simple, time-saving connection of the connection cable to the vehicle's electrical system, which is consequently particularly suited to mass production. Due to the stiffness, the worker can plug the connection cable onto the connection part with one hand. However, the stiff connection part is associated with the disadvantage that shearing and leverage forces that strain the solder connection between the connection element and the pane can occur at the time the connection cable is plugged on.

The mechanical straining of the solder connection is problematic in particular with lead-free soldering compounds, which will assume increasing significance in the future. Thus, for example, due to the End-of-Life Vehicle Directive 2000/53/EC, lead-containing solders must be replaced by lead-free solders within the EU. However, lead-free solders typically have significantly less ductility than lead-containing solders and are frequently significantly more brittle. Consequently, lead-free soldering compounds are incapable of compensating mechanical strains to the same extent.

In order to avoid the mechanical strains at the time of plugging on the connection cable as a result of shearing and leverage forces, the connection parts can be implemented as flexible connection cables. The flexible connection cables can, for example, be implemented as flat-weave ribbons, which are provided with a plug connector. Connection elements with flexible connection cables are known, for example, from DE 4439645 C1 and DE 9013380 U1. Shearing and leverage forces are, to be sure, prevented by this; however, the connection cable can be plugged onto the flexible connection cable with one hand only with difficulty or not at all. Usually, the worker will need both hands: one to hold the connection cable in place and the other to guide the connection cable. This increases the production-technology cycle times and is, consequently, disadvantageous for industrial mass production.

In light of the above, the object of the present invention is to provide an improved pane with an electrical connection element and a flexible connection cable. The connection cable should, in particular, be suitable to be connected with one hand to a connection cable to an external electrical component such as an external power supply.

BRIEF SUMMARY OF THE INVENTION

The object of the present invention is accomplished according to the invention by a pane with an electrical connection element and a connection cable according to the independent claim 1. Preferred embodiments emerge from the subclaims.

The pane according to the invention with at least one electrical connection element and a connection cable comprises at least:
a substrate,
an electrically conductive structure on a region of the substrate,
a connection element, which is connected via a soldering compound to a region of the electrically conductive structure, and
a flexible connection cable connected to the connection element.

The connection cable is provided with a stiffening element and the connection cable with the stiffening element is shrouded by a heat shrink tube.

Through the combined action of the stiffening element and of the heat shrink tube, the flexible connection cable can be provided with adequate stiffness such that one-handed plugging on of a connection cable becomes possible. It can, at the same time, be achieved that adequate flexibility remains such that, in contrast to rigid connection parts, critical shearing and leverage forces can be avoided. These are major advantages of the invention.

The degree of stiffness can be adjusted depending on the requirements of the individual case by the design of the stiffening element and of the heat shrink tube. The solution according to the invention thus has advantageously high flexibility in application.

The connection element in the context of the invention is a rigid, stiff, solid component that is soldered to the electrically conductive structure. The connection element is preferably implemented in one piece. The connection element can, however, in principle, also be implemented with multiple parts, i.e., can be made of two or more stiff individual parts connected to one another.

The flexible connection cable is a non-rigid, electrically conductive cable. The connection of the connection cable to the connection element is done, for example, by soldering, welding, gluing using an electrically conductive adhesive, crimping, clamping, or other methods familiar per se to the person skilled in the art. The connection cable can also be provided with a cable-end sleeve or a crimp (a metal part crimped around the connection cable) that is connected to the connection element.

The connection cable need not be provided with the stiffening element along its entire length. At least one region of the connection cable is provided with the stiffening element. According to the invention, the connection cable is thus provided with the stiffening element, at least in sections. However, advantageously, the greater part of the connection cable should be provided with the stiffening element.

The stiffening element has, in an advantageous embodiment, a length of at least 50% of the length of the connection cable, particularly advantageously, at least 80%. The stiffening element preferably has a length of 50% to 100% of the length of the connection cable, particularly preferably of 80% to 100%. Thus, a particularly advantageous stiffening is obtained. In other words, the connection cable is preferably provided with the stiffening element along at least 50% of its length, in particular 50% to 100%, particularly preferably at least 80% of its length, in particular 80% to 100%.

The connection cable is preferably implemented as a stranded-wire conductor round cable or as a flat-weave ribbon. The stiffening element is preferably implemented as an insulating sheath or as a reinforcing rail.

The connection cable has, in an advantageous embodiment, a length greater than 2 cm, preferably greater than 3 cm, particularly preferably greater than 4 cm, most particularly preferably greater than 5 cm. In another advantageous embodiment, the connection cable has a length greater than 10 cm. In the case of connection cables with this minimum length, the invention has a particularly advantageous effect. Very short connection cables enable, possibly solely due to their reduced length, a one-handed connection of the connection cable, whereas with increasing length, flexibility of the connection cable proves increasingly bothersome. Connection cables with the minimum lengths indicated profit particularly from the advantages of the stiffening according to the invention.

The connection cable preferably has a length of less than 20 cm.

In a first preferred embodiment of the invention, the connection cable is a stranded wire conductor implemented as a round cable and the stiffening element is an insulating sheath, in particular a polymeric insulating sheath. Round cables are customarily sold with a polymeric insulating sheath, which is utilized as a stiffening element in this embodiment without great additional expense. The embodiment is, consequently, advantageously simple and economical to realize.

The insulating sheath preferably contains polyethylene (PE), polypropylene (PP), polyisobutylene (PIB), polybutylene (PB), polyvinylchloride (PVC), polytetrafluoroethylene (PTFE), polyethylene terephthalate (PET), polyurethane (PU), synthetic rubber, or natural rubber. However, the insulating sheath can also contain other suitable insulating materials.

The insulating sheath is preferably arranged along the entire length of the connection cable, with the exception of the ends, stripped as needed.

In a second preferred embodiment of the invention, the connection cable is a flat-weave ribbon and the stiffening element is a reinforcing rail. A flat-weave ribbon is also, for example, referred to as a woven wire strand conductor or woven wire. A flat-weave ribbon has, for example, a thickness of 0.5 mm to 2 mm and a width of 3 mm to 10 mm.

The reinforcing rail preferably contains a metal or a metal alloy, particularly preferably steel, stainless steel, copper, aluminum, silver, gold, tungsten, zinc, or brass. The use of electrically conductive materials for the reinforcing rail has the advantage that, in addition to the stiffening action, the current carrying capacity of the connection cable is also increased.

Particularly suitable for this are copper, aluminum, silver, gold, tungsten, zinc, or brass. The reinforcing rail is made, in particular, from a metal sheet. The reinforcing rail preferably has a material thickness of 0.1 mm to 2 mm, particularly preferably of 0.2 mm to 1 mm. This is particularly advantageous for the stiffening effect of the reinforcing rail.

The reinforcing rail has, in an advantageous embodiment, a length of at least 50% of the length of the connection cable, particularly advantageously at least 80%. The reinforcing rail preferably has a length of 50% to 100% of the length of the connection cable, particularly preferably of 80% to 100%. Thus, advantageous stiffening is obtained. In other words, the connection cable is preferably provided with the reinforcing rail along at least 50% of its length, in particular 50% to 100%, particularly preferably at least 80% of its length, in particular 80% to 100%.

The reinforcing rail can be implemented as a single strip. The reinforcing rail can, however, also have other shapes. Thus, the reinforcing rail can be implemented, for example, as a U-profile into which the connection cable is inserted.

The connection cable can be placed on the reinforcing rail. Alternatively, the reinforcing rail can also be embedded in the connection cable.

The connection cable can also have more than one reinforcing rail, for example, two reinforcing rails that are arranged on opposite sides of the connection cable.

The reinforcing rail can be provided with local widenings or bulges. These results in a thickening of the heat-shrink-tube-coated connection cable with a stiffening element that can be utilized to fix the connection cable at the point of use of the pane, for example, in a vehicle body. For this, the thickening can, for example, be inserted into a suitable clamp. By means of the fixing, clattering of the connection cable during travel can be prevented and the risk of damage to the connection cable can be reduced.

By means of the heat shrink tube, the reinforcing rail is reliably fixed on the connection cable. However, the reinforcing rail can be fastened on the connection cable by additional measures, for example, by crimping or gluing.

The heat shrink tube preferably contains at least one thermoplastic polymer, particularly preferably polyolefins (such as PE, PP, PB, or PIB), PVC, polyvinylidene fluoride (PVDF), PTFE, or fluoro rubber (FKM). The heat shrink tube preferably has a wall thickness (after shrinkage) of 0.2 mm to 2 mm.

The heat shrink tube is preferably arranged along at least 80% of the length of the connection cable, particularly preferably at least 90%. The heat shrink tube is arranged, in a particularly advantageous embodiment, along the entire length of the connection element. The heat shrink tube can also shroud components other than the connection cable, for example, a region of the connection element or a region of a plug connector connected to the connection cable.

In an advantageous embodiment, the connection cable is provided by the stiffening element with sufficient stiffness such that when it is brought into a certain angle relative to the soldering surface of the connection element, it independently maintains this arrangement angle. Here, the soldering surface is that mostly flat surface of the connection element that is bonded to the electrically conductive structure on the substrate by means of the soldering compound. Consequently, the arrangement angle relative to the soldering surface typically corresponds roughly to the arrangement angle relative to the substrate surface. In this context, realizable, i.e., independently stable arrangement angles are preferably at least in the range from 30° to 60°, preferably from 20° to 70°. This is particularly advantageous in terms of one-handed plugging on of the connection cable during mass production.

In an advantageous embodiment, the connection cable has a plug on its end away from the connection element. The plug is, in a preferred embodiment, a standardized motor vehicle flat plug. The motor vehicle flat plug preferably has a height of 0.8 mm and a width of 4.8 mm, 6.3 mm, or 9.5 mm. The embodiment with a width of 6.3 mm is particularly preferred, since this corresponds to the motor vehicle flat plugs per DIN 46244 customarily used in this sector. This yields a simple and also reversible capability for electrically contacting the conductive structure on the substrate.

The substrate preferably contains glass, particularly preferably soda lime glass. The substrate is preferably a glass pane, in particular a window pane. However, the substrate can, in principle, also contain other types of glass, for example, quartz glass or borosilicate glass. In another preferred embodiment, the substrate contains a polymer, in particular polycarbonate or polymethylmethacrylate. Due to the saving in weight, polymeric materials are increasingly of interest for window panes. The substrate can also contain other polymers, for example, polyethylene, polypropylene, polystyrene, polybutadiene, polynitriles, polyesters, polyurethane, polyvinylchloride, polyacrylate, polyamide, or polyethylene terephthalate.

The substrate is preferably transparent or translucent. The substrate preferably has a thickness of 0.5 mm to 25 mm, particularly preferably of 1 mm to 10 mm, and most particularly preferably of 1.5 mm to 5 mm.

In a preferred embodiment, the difference between the coefficient of thermal expansion of the substrate and the coefficient of thermal expansion of the connection element is less than $5 \times 10^{-6}/°$ C., preferably less than $3 \times 10^{-6}/°$ C. By means of such a small difference, critical thermal stresses as a result of the soldering operation can be advantageously avoided and better adhesion is obtained. The prevention of thermal stresses is necessary in particular with the use of lead-free soldering compounds, since, because of their low ductility, these can compensate mechanical stresses less well than lead-containing soldering compounds.

The coefficient of thermal expansion of the substrate is preferably from $8 \times 10^{-6}/°$ C. to $9 \times 10^{-6}/°$ C. The substrate preferably contains glass, in particular soda lime glass, which preferably has a coefficient of thermal expansion from $8.3 \times 10^{-6}/°$ C. to $9 \times 10^{-6}/°$ C. in a temperature range of 0° C. to 300° C.

The coefficient of thermal expansion of the connection element is, in an advantageous embodiment, from $4 \times 10^{-6}/°$ C. to $15 \times 10^{-6}/°$ C., preferably from $9 \times 10^{-6}/°$ C. to $13 \times 10^{-6}/°$ C., particularly preferably from $10 \times 10^{-6}/°$ C. to $11.5 \times 10^{-6}/°$ C., most particularly preferably from $10 \times 10^{-6}/°$ C. to $11 \times 10^{-6}/°$ C., and in particular from $10 \times 10^{-6}/°$ C. to $10.5 \times 10^{-6}/°$ C. in a temperature range of 0° C. to 300° C.

The connection element preferably contains at least one iron-containing alloy. The connection element particularly preferably contains at least 50 wt.-% to 89.5 wt.-% iron, 0 wt.-% to 50 wt.-% nickel, 0 wt.-% to 20 wt.-% chromium, 0 wt.-% to 20 wt.-% cobalt, 0 wt.-% to 1.5 wt.-% magnesium, 0 wt.-% to 1 wt.-% silicon, 0 wt.-% to 1 wt.-% carbon, 0 wt.-% to 2 wt.-% manganese, 0 wt.-% to 5 wt.-% molybdenum, 0 wt.-% to 1 wt.-% titanium, 0 wt.-% to 1 wt.-% niobium, 0 wt.-% to 1 wt.-% vanadium, 0 wt.-% to 1 wt.-% aluminum, and/or 0 wt.-% to 1 wt.-% tungsten.

The connection element can, for example, contain an iron-nickel-cobalt alloy, such as Kovar (FeCoNi) with a coefficient of thermal expansion of usually roughly $5 \times 10^{-6}/°$ C. The composition of Kovar is, for example, 54 wt.-% iron, 29 wt.-% nickel, and 17 wt.-% cobalt.

In a particularly preferred embodiment, the connection element contains a chromium-containing steel. Chromium-containing, in particular so-called rust-free or stainless steel is available at a reasonable cost. Connection elements made of chromium-containing steel have, in comparison with many prior art connection elements made, for example, of copper, high stiffness, which results in advantageous stability of the connection element. Also, chromium-containing steel has, compared to many prior art connection elements, for example, those made of titanium, improved solderability, which results from higher thermal conductivity.

The connection element contains, in an advantageous embodiment, a chromium-containing steel with a chromium content greater than or equal to 5 wt.-%, preferably greater than or equal to 10.5 wt.-%. Other alloying constituents such as molybdenum, manganese, or niobium result in improved corrosion resistance or altered mechanical properties, such as tensile strength or cold formability.

The connection element preferably contains at least 49 wt.-% to 95 wt.-% iron, 5 wt.-% to 30 wt.-% chromium, 0 wt.-% to 1 wt.-% carbon, 0 wt.-% to 10 wt.-% nickel, 0 wt.-% to 2 wt.-% manganese, 0 wt.-% to 5 wt.-% molybdenum, 0 wt.-% to 2 wt.-% niobium, and 0 wt.-% to 1 wt.-% titanium. The connection can additionally contain admixtures of other elements, including vanadium, aluminum, and nitrogen.

The connection element more preferably contains at least 57 wt.-% to 93 wt.-% iron, 7 wt.-% to 25 wt.-% chromium, 0 wt.-% to 1 wt.-% carbon, 0 wt.-% to 8 wt.-% nickel, 0 wt.-% to 2 wt.-% manganese, 0 wt.-% to 4 wt.-% molybdenum, 0 wt.-% to 2 wt.-% niobium, and 0 wt.-% to 1 wt.-% titanium. The connection element can additionally contain admixtures of other elements, including vanadium, aluminum, and nitrogen.

The connection element particularly preferably contains at least 66.5 wt.-% to 89.5 wt.-% iron, 10.5 wt.-% to 20 wt.-% chromium, 0 wt.-% to 1 wt.-% carbon, 0 wt.-% to 5 wt.-% nickel, 0 wt.-% to 2 wt.-% manganese, 0 wt.-% to 2.5 wt.-% molybdenum, 0 wt.-% to 2 wt.-% niobium, and 0 wt.-% to 1 wt.-% titanium. The connection element can additionally contain admixtures of other elements, including vanadium, aluminum, and nitrogen.

The connection element most particularly preferably contains at least 73 wt.-% to 89.5 wt.-% iron, 10.5 wt.-% to 20 wt.-% chromium, 0 wt.-% to 0.5 wt.-% carbon, 0 wt.-% to 2.5 wt.-% nickel, 0 wt.-% to 1 wt.-% manganese, 0 wt.-% to 1.5 wt.-% molybdenum, 0 wt.-% to 1 wt.-% niobium, and 0 wt.-% to 1 wt.-% titanium. The connection element can additionally contain admixtures of other elements, including vanadium, aluminum, and nitrogen.

The connection element contains in particular at least 77 wt.-% to 84 wt.-% iron, 16 wt.-% to 18.5 wt.-% chromium, 0 wt.-% to 0.1 wt.-% carbon, 0 wt.-% to 1 wt.-% manganese, 0 wt.-% to 1 wt.-% niobium, 0 wt.-% to 1.5 wt.-% molybdenum, and 0 wt.-% to 1 wt.-% titanium. The connection element can additionally contain admixtures of other elements, including vanadium, aluminum, and nitrogen.

Particularly suitable chromium-containing steels are steels of material numbers 1.4016, 1.4113, 1.4509, and 1.4510 per EN 10 088-2.

The invention is not restricted to a specific shape of the connection element. The invention can instead be applied to connection elements of any shape. The connection element can, for example, be shaped round, oval, rectangular, or bridge-shaped.

The material thickness of the connection element is preferably from 0.1 mm to 4 mm, particularly preferably from 0.2 mm to 2 mm, most particularly preferably from 0.5 mm and 1 mm. The material thickness is preferably constant, which is particularly advantageous in terms of simple production.

The dimensions of the connection element can be freely selected by the person skilled in the art according to the requirements of the individual case. The connection element has, for example, a length and a width of 1 mm to 50 mm. The length of the connection element is preferably from to, particularly preferably from to. The width of the connection element is preferably from 10 mm to 30 mm, particularly preferably from 2 mm to 10 mm. Connection elements with these dimensions can be handled particularly well and are particularly suitable for the electrical contacting of conductive structures on panes.

In a preferred embodiment, the soldering compound according to the invention is lead-free. This is particularly advantageously in terms of the environmental impact of the pane according to the invention with an electrical connection element. In the context of the invention, a soldering compound that includes, according to the EC Guideline "2002/95/EC on the Restriction of the Use of Certain Hazardous Substances in Electrical and Electronic Equipment", a content less than or equal to 0.1 wt.-% lead, preferably no lead, is understood as a lead-free soldering compound.

The invention is particularly suitable for the use of lead-free soldering compounds. The stiffening of the connection cable according to the invention enables a simple and time-saving connection of the connection cable to the vehicle's electrical system. On the other hand, the connection cable is, however, also sufficiently flexible such that shearing and leverage forces that strain the mechanical connection between the connection element and the substrate can be avoided. Such shearing and leverage forces can damage the solder connection, in particular with lead-free soldering compounds, since they are for the most part less ductile than prior art lead-containing soldering compounds.

The soldering compound preferably contains tin and bismuth, indium, zinc, copper, silver, or composition thereof. The tin content in the solder composition according to the invention is from 3 wt.-% to 99.5 wt.-%, preferably from 10 wt.-% to 95.5 wt.-%, particularly preferably from 15 wt.-% to 60 wt.-%. The content of bismuth, indium, zinc, copper, silver, or compositions thereof is, in the solder composition according to the invention, from 0.5 wt.-% to 97 wt.-%, preferably 10 wt.-% to 67 wt.-%, while the content of bismuth, indium, zinc, copper, or silver can be 0 wt.-%. The solder composition can contain nickel, germanium, aluminum, or phosphorus with a content from 0 wt.-% to 5 wt.-%. The solder composition according to the invention particularly preferably contains Bi40Sn57Ag3, Sn40Bi57Ag3, Bi59Sn40Ag1, Bi57Sn42Ag1, In97Ag3, Sn95.5Ag3.8Cu0.7, Bi67In33, Bi33In50Sn17, Sn77.2In20Ag2.8, Sn95Ag4Cu1, Sn99Cu1, Sn96.5Ag3.5, Sn96.Ag3Cu0.5, Sn97Ag3, or mixtures thereof.

In an advantageous embodiment, the soldering compound contains bismuth. It has been demonstrated that a bismuth-containing solder compound results in particularly good adhesion of the connection element according to the invention on the pane, whereby damage to the pane can be avoided. The bismuth content of the soldering composition is preferably from 0.5 wt.-% to 97 wt.-%, particularly preferably from 10 wt.-% to 67 wt.-%, and most particularly preferably from 33 wt.-% to 67 wt.-%, in particular from 50 wt.-% to 60 wt.-%. The soldering compound preferably contains, besides bismuth, tin and silver or tin, silver, and copper. In a particularly preferred embodiment, the soldering compound contains at least 35 wt.-% to 69 wt.-% bismuth, 30 wt.-% to 50 wt.-% tin, 1 wt.-% to 10 wt.-% silver, and 0 wt.-% to 5 wt.-% copper. In a most particularly preferred embodiment, the soldering compound contains at least 49 wt.-% to 60 wt.-% bismuth, 39 wt.-% to 42 wt.-% tin, 1 wt.-% to 4 wt.-% silver, and 0 wt.-% to 3 wt.-% copper.

In another advantageous embodiment, the soldering compound contains from 90 wt.-% to 99.5 wt.-% tin, preferably from 95 wt.-% to 99 wt.-%, particularly preferably from 93 wt.-% to 98 wt.-%. The soldering compound preferably contains, besides tin, from 0.5 wt.-% to 5 wt.-% silver and from 0 wt.-% to 5 wt.-% copper.

The layer thickness of the soldering compound is preferably less than or equal to $6.0 \times 10^{-4}$ m, particularly preferably less than $3.0 \times 10^{-4}$ m.

The soldering compound flows out with an outflow width of preferably less than 1 mm from the intermediate space between the solder surface of the connection element and of the electrically conductive structure. In a preferred embodiment, the maximum outflow width is less than 0.5 mm and, in particular, roughly 0 mm. This is particularly advantageous with regard to the reduction of mechanical stresses in the pane, the adhesion of the connection element, and the amount of solder. The maximum outflow width is defined as the distance between the outer edges of the solder region and the point of the solder compound crossover, at which the soldering compound drops below a layer thickness of 50 μm. The maximum outflow width is measured on the solidified soldering compound after the soldering operation. A desired maximum outflow width is obtained through a suitable selection of soldering compound volume and vertical distance between the connection element and the electrically conductive structure, which can be determined by simple experiments. The vertical distance between the connection element and the electrically conductive structure can be predefined by an appropriate process tool, for example, a tool with an integrated spacer. The maximum outflow width can even be negative, i.e., pulled back into the intermediate space formed by the solder region of the electrical connection element and the electrically conductive structure. In an advantageous embodiment of the pane according to the invention, the maximum outflow width is pulled back in a concave meniscus into the intermediate space formed by the solder region of the electrical connection element and the electrically conductive structure. A concave meniscus is created, for example, by increasing the vertical distance between the spacer and the conductive structure during the soldering operation, while the solder is still fluid. The advantage resides in the reduction of mechanical stresses in the pane, in particular, in the critical region present with a large soldering compound crossover.

The electrically conductive structure according to the invention preferably has a layer thickness of 5 μm to 40 μm, particularly preferably of 5 μm to 20 μm, most particularly preferably of 8 μm to 15 μm, and in particular of 10 μm to 12 μm. The electrically conductive structure according to the invention preferably contains preferably silver, particularly preferably silver particles and glass frits, in particular in the form of a printed-on and fired paste.

In an advantageous improvement, the soldering surface of the connection element has spacers. The spacers are preferably implemented in one piece with the connection element, for example, by stamping or deep drawing. The spacers preferably have a width of $0.5 \times 10^{-4}$ m to $10 \times 10^{-4}$ m and a height of $0.5 \times 10^{-4}$ m to $5 \times 10^{-4}$ m, particularly preferably of $1 \times 10^{-4}$ m to $3 \times 10^{-4}$ m. By means of the spacers, a homogeneous, uniformly thick, and uniformly fused layer of the soldering compound is obtained. Thus, mechanical stresses between the connection element and the pane can be reduced and the adhesion of the connection element can be improved. This is particularly advantageous with the use of lead-free soldering compounds that can compensate mechanical stresses less well due to their lower ductility compared to lead-containing soldering compounds.

In an advantageous improvement of the invention, at least one contact bump, which serves for contacting the connection element with the soldering tool during the soldering operation, can be arranged on the surface of the connection element facing away from the substrate. The contact bump is preferably curved convexly at least in the region of contacting with the soldering tool. The contact bump preferably has a height of 0.1 mm to 2 mm, particularly preferably of 0.2 mm to 1 mm. The length and width of the contact bump is preferably between 0.1 and 5 mm, most particularly preferably between 0.4 mm and 3 mm. The contact bumps are preferably implemented in one piece with the connection element, for example, by stamping or deep drawing. For the soldering, electrodes whose contact side is flat can be used. The electrode surface is brought into contact with the contact bump. The electrode surface is arranged parallel to the surface of the substrate. The contact region between the electrode surface and the contact bump forms the soldering point. The position of the soldering point is determined by the point on the convex surface of the contact bump that has the greatest vertical distance from the surface of the substrate. The position of the soldering point is independent of the position of the solder electrode on the connection element. This is particularly advantageous with regard to reproducible, uniform heat distribution during the soldering operation. The heat distribution during the soldering operation is determined by the position, the size, the arrangement, and the geometry of the contact bump.

The connection element can have a coating (wetting layer) that contains, for example, nickel, copper, zinc, tin, silver, gold, or alloys or layers thereof, preferably silver. By this means, improved wetting of the connection element with the soldering compound and improved adhesion of the connection element are achieved. In addition, the electrical conductivity of the connection element can be increased by such a coating.

In an advantageous embodiment, the connection element is provided with an adhesion-promoting layer, preferably made of nickel and/or copper, and additionally with a layer containing silver. The connection element according to the invention is most particularly preferably coated with 0.1 μm to 0.3 μm nickel and, thereon, 3 μm to 20 μm silver.

The shape of the electrical connection element can form one or a plurality of solder depots in the intermediate space between the connection element and the electrically conductive structure. The solder depots and wetting properties of the solder on the connection element prevent the outflow of the soldering compound from the intermediate space. Solder depots can be rectangular, rounded, or polygonal in design.

The invention also includes a method for producing a pane according to the invention with at least one electrical connection element, wherein a)—the connection cable is provided with the stiffening element and the heat shrink tube and is connected to the connection element, and
soldering compound is applied on the connection element,
b) the connection element is arranged on the electrically conductive structure on the substrate, and
c) the connection element is connected via the soldering compound to the electrically conductive structure with energy input.

Process step (a) is not tied to a specific order of the individual steps. The application of the soldering compound can be done before or after, in principle, even simultaneously with the mounting of the connection cable. Also, the connection of the connection cable to the connection element, the mounting of the stiffening element on the connection cable and the application of the heat shrink tube can be done in any order. Thus, the connection cable can, for example, be prepared with the stiffening element, then mounted on the connection element, and then provided with the heat shrink tube. Alternatively, for example, the connection cable can be attached on the connection element and then the stiffening element mounted on the connection cable, and, thereafter, the heat shrink tube attached.

The connection of the connection cable to the heat shrink tube typically includes a heating step, which results in shrinkage of the heat shrink tube and, thus, to the durably stable connection.

The soldering compound is preferably applied as platelets or flattened drops with a fixed layer thickness, volume, shape, and arrangement on the connection element. The layer thickness of the soldering compound platelet is preferably less than or equal to 0.6 mm. The shape of the soldering compound platelet is preferably governed by the shape of the soldering surface of the connection element and is, for example, rectangular, circular, oval, or rectangular with rounded corners, or rectangular with semicircles positioned on two opposing sides.

The introduction of the energy at the time of the electrical connection of an electrical connection element and an electrically conductive structure is preferably done with stamp soldering, thermode soldering, piston soldering, laser soldering, hot air soldering, induction soldering, resistance soldering, and/or with ultrasound.

The electrically conductive structure can be mounted on the substrate by methods known per se, for example, by screenprinting methods.

The invention also includes the use of a pane according to the invention with at least one electrical connection element in buildings or in means of transportation for travel on land, in the air, or on water, in particular in rail vehicles or motor vehicles, preferably as a windshield, rear window, side window, and/or roof panel, in particular as a heatable pane or as a pane with an antenna function.

BRIEF DESCRIPTION OF DRAWINGS

The invention is explained in detail with reference to drawings and exemplary embodiments. The drawings are schematic representations and not true to scale. The drawings in no way restrict the invention. They depict.

DETAILED DESCRIPTION OF THE INVENTION

Figure 1:
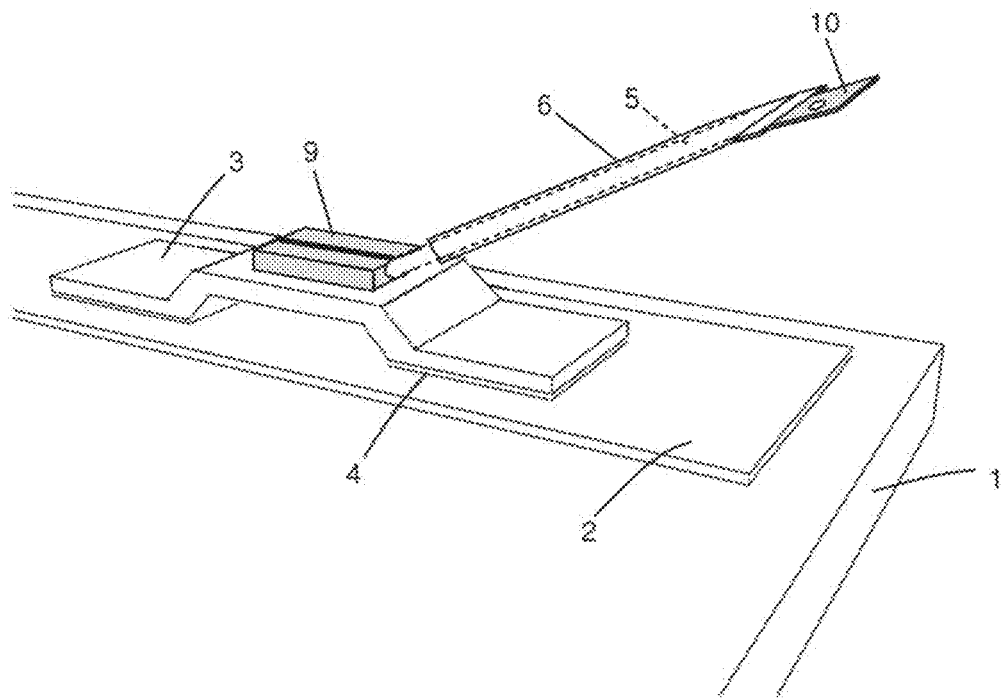
FIG. 1 a perspective view of an embodiment of the pane according to the invention with an electrical connection element and a flexible/connection cable, FIG. 2 a cross-section through the pane of FIG. 1 along the direction of extension of the connection cable, FIG. 3 a cross-section through another embodiment of the pane according to the invention, FIG. 4 a cross-section through the connection cable perpendicular to its direction of extension in four embodiments of the invention, FIG. 5 a flowchart of an embodiment of the method according to the invention for producing a pane according to the invention, and FIG. 6 a flowchart of another embodiment of the method according to the invention.
Figure 2:
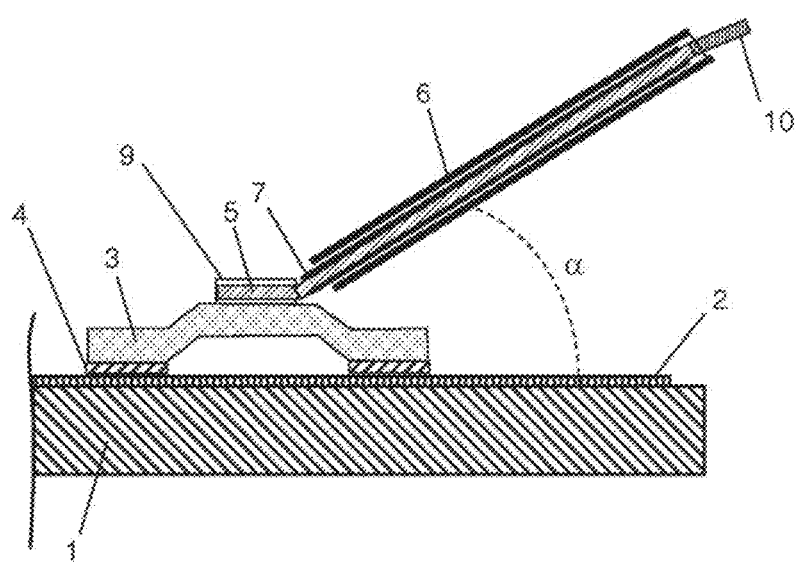

FIG. 1 and FIG. 2 depict in each case a detail of a pane according to the invention in the region of the electrical connection element 3. The pane comprises a substrate 1, which is a 3-mm-thick thermally prestressed single pane safety glass made of soda lime glass. The substrate 1 has, for example, a width of 150 cm and a height of 80 cm and is intended as a rear window of a passenger car. An electrically conductive structure 2 in the form of a heating conductor structure that contains silver particles and glass frits is printed onto the substrate 1. In the edge region of the pane, the electrically conductive structure 2 is widened to a width of, for example, 10 mm and forms a contact surface for the electrical connection element 3. A masking screenprint (not shown) is also situated in the edge region of the substrate 1.

The connection element 3 is implemented in the form of a bridge. It comprises two foot regions on whose surfaces facing the substrate 1 the soldering surfaces are arranged. The soldering surfaces are connected via a soldering compound 4 to the electrically conductive structure 2. Between the foot regions is arranged a bridging region that includes an elevated center section that is arranged parallel to the foot regions. The bridging region is not directly connected to the conductive structure via the soldering compound. The connection element 3 has, for example, a length of 24 mm, a width of 4 mm, and a material thickness of 0.8 mm. The connection element 3 is made of chromium-containing steel of material number 1.4509 per EN 10 088-2 (ThyssenKrupp Nirosta® 4509) with an coefficient of thermal expansion of $10.5 \times 10^{-6}/°$ C. in the temperature range from 20° C. to 300° C. The soda lime glass of the substrate 1 has a coefficient of thermal expansion of roughly $9 \times 10^{-6}/°$ C. Because of the small difference in the coefficients of expansion, critical thermal stresses can be avoided during soldering.

The soldering compound 4 effects a durable electrical and mechanical connection between the electrical connection element 3 and the electrically conductive structure 2. The soldering compound 4 is lead-free and consists of 57 wt.-% bismuth, 40 wt.-% tin, and 3 wt.-% silver. The soldering compound 4 has a thickness of 250 μm.

A flexible connection cable 5 is mounted on the bridging region of the connection element 3. The connection cable 5 is a round cable that contains copper wire strands. The connection cable is provided with an insulating sheath 7 made of PE. The end of the connection cable connected to the connection element 3 is stripped and provided with a crimped metal platelet 9 (B crimp). The crimp 9 is welded to the connection element 3.

The connection cable 5 is provided to be connected to a connection cable (not shown) to the external power supply. For this, the connection cable 5 has, on its end away from the connection element 3, a plug 10, which is implemented as a standardized motor vehicle flat plug. The length of the connection cable 5 is, for example, 6 cm.

After installation of the prefabricated pane with a connection element and a connection cable in a vehicle body, the electrical contacting can be done by plugging the connection cable onto the plug 10. This plugging should preferably be done with one hand by the worker, which saves time. In order to enable such one-handed plugging, the per se very flexible connection cable 5 is stiffened according to the invention. The stiffening is done, for one thing, by the insulating sheath 7, which functions as a stiffening element. The stiffening is done, for another thing, by a heat shrink tube 6, which is arranged around the connection cable 5 along with the insulating sheath 7. The heat shrink tube 6 is made, for example, of PVC and has a thickness of roughly 0.5 mm.

The connection cable 5 has an arrangement angle α relative to the soldering surfaces of the connection element 3 or to the substrate surface of, for example, 45°. This arrangement angle is kept stable independently by the stiffened connection cable 5. The stable arrangement angle α as well as the stiffening (high bending force) of the connection cable 5 enable one-handed plugging on of the connection cable to the vehicle's electrical system. At the same time, however, the connection cable is not so stiff that critical shearing or leverage forces damage the soldering compound 4. These are major advantages of the present invention.

Figure 3:
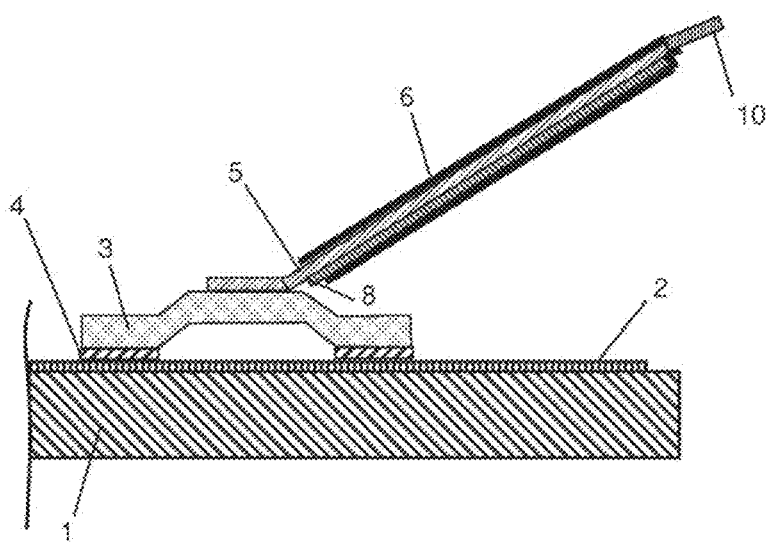

FIG. 3 depicts a cross-section through another embodiment of the pane according to the invention in the region of the electrical connection element 3. The substrate 1, the electrically conductive structure 2, the connection element 3, and the soldering compound 4 are configured as in the previous exemplary embodiment.

The connection cable 5 is a flat-weave ribbon of copper strands. The length of the connection cable 5 is, for example, 11 cm. One end of the flat-weave ribbon is electrically conductively connected to the connection element 3, for example, welded, glued, or soldered. The other end of the flat-weave ribbons is provided with a standardized motor vehicle flat plug 10.

The connection cable 5 is provided with a reinforcing rail 8 as a stiffening element. The reinforcing rail 8 is made, for example, of an aluminum sheet with a material thickness of, for example, 0.5 mm, which is shaped as a U-profile. The U-profile is dimensioned according to the connection cable 5, which is inserted into the U-profile. The length of the reinforcing rail 8 is, for example, 95% of the length of the connection cable 5.

The reinforcing rail 8 is, in turn, fixed on the connection cable 5 with an heat shrink tube 6. The heat shrink tube 6 and the reinforcing rail 8 together effect the stiffening of the connection cable 5 according to the invention.

The reinforcing rail 8 could alternatively also be crimped around the connection cable 5, by which means an even more stable connection would be produced.

Figure 4:
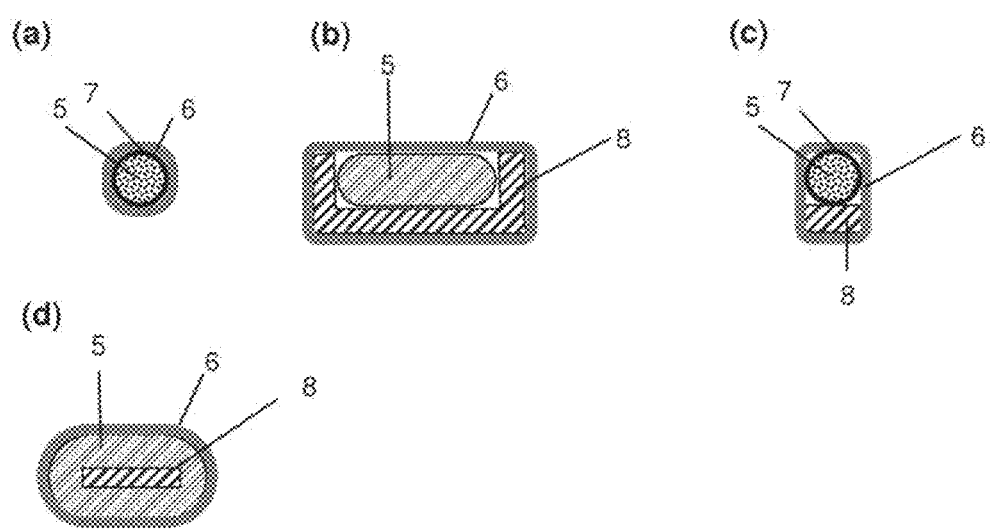

FIG. 4 depicts cross-sections through the connection cable 5 perpendicular to its direction of extension in four embodiments of the invention.

Part (a) depicts the embodiment of FIG. 2 with the round cable as the connection cable 5 and the insulating sheath 7 as a stiffening element.

Part (b) depicts the embodiment of FIG. 3 with the flat-weave ribbon as the connection cable 5 and the reinforcing rail 8 as a stiffening element.

Part (c) depicts another embodiment of the invention. The connection cable 5 is a round cable as in part (a) with an insulating sheath 7 as a stiffening element. The connection cable 5 has, moreover, a second stiffening element in the form of a reinforcing rail 8. The reinforcing rail 8 is a simple strip of an aluminum sheet, on which the connection cable 5 with the insulating sheath 7 is arranged. The connection cable 5 with the insulating sheath 7 and the reinforcing rail 8 are enshrouded and fixed on one another by a heat shrink tube 6. The increased reinforcing action by the combination of the insulating sheath and the reinforcing rail is useful in particular with connection cables with a length greater than 10 cm.

Part (d) depicts another embodiment of the invention, wherein the connection cable 5 is implemented as a flat-weave ribbon and the reinforcing element is implemented as a reinforcing rail 8. The reinforcing rail 8 is not applied on the connection cable 5 as in part (b), but is, instead, inserted into the connection cable 5.

Figure 5:
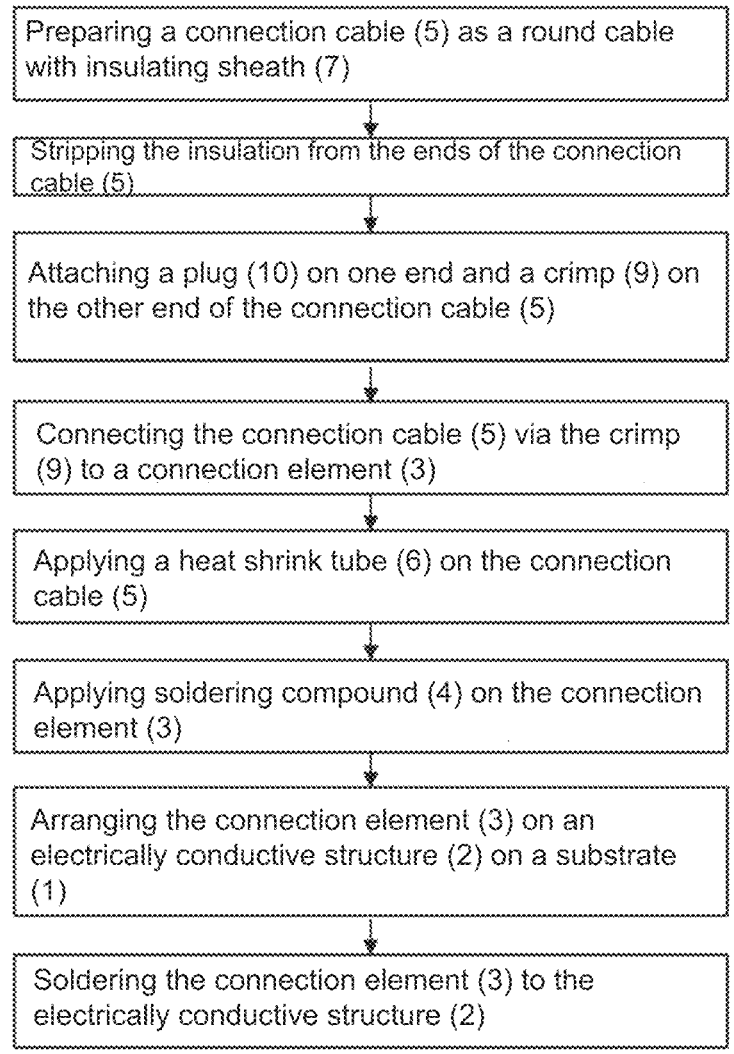

FIG. 5 depicts an exemplary embodiment of the method according to the invention for producing a pane with an electrical connection element 3 and a flexible connection cable 5. The method results in the pane of FIGS. 1 and 2.

Figure 6:
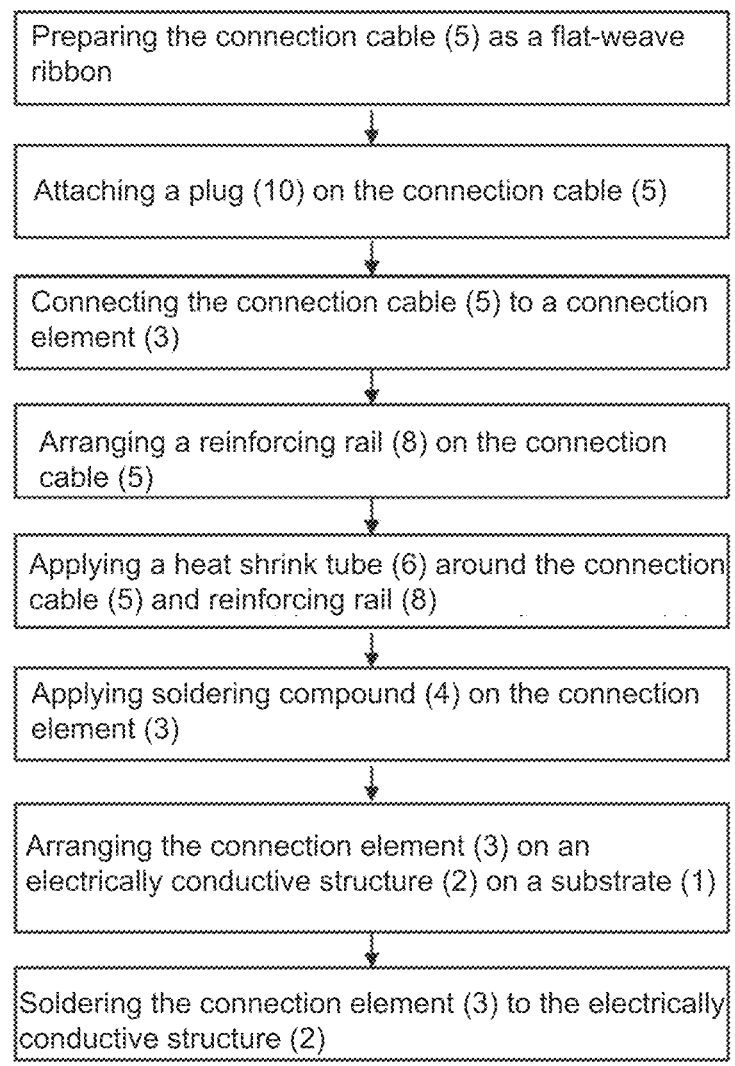

FIG. 6 depicts another exemplary embodiment of the method according to the invention for producing a pane with an electrical connection element 3 and a flexible connection cable 5. The method results in pane of FIG. 3.

LIST OF REFERENCE CHARACTERS (1) substrate
(2) electrically conductive structure
(3) electrical connection element
(4) soldering compound
(5) connection cable
(6) heat shrink tube
(7) insulating sheath
(8) reinforcing rail
(9) crimp
(10) plug
α arrangement angle of 5

The invention claimed is:

1. A pane with an electrical connection element and a connection cable, the pane comprising:
   (a) a substrate,
   (b) an electrically conductive structure on a portion of the substrate,
   (c) a connection element connected via a soldering compound with the electrically conductive structure, and
   (d) a flexible connection cable connected with the connection element,
      wherein the connection cable is provided with a stiffening element and the connection cable with the stiffening element is enshrouded by a heat shrink tube,
      wherein the stiffening element has a length of at least 80% of the length of the connection cable.

2. The pane according to claim 1, wherein the stiffening element has a length of at least 50% of the length of the connection cable.

3. The pane according to claim 1, wherein the connection cable is a stranded wire conductor implemented as a round cable and the stiffening element is an insulating sheath.

4. The pane according to claim 1, wherein the connection cable it is a flat-weave ribbon and the stiffening element is a reinforcing rail.

5. The pane according to claim 4, wherein the reinforcing rail comprises a metal or a metal alloy, and has a material thickness of 0.1 mm to 2 mm.

6. The pane according to claim 4, wherein the reinforcing rail comprises one of: steel, stainless steel, copper, aluminum, silver, gold, tungsten, zinc or brass.

7. The pane according to claim 4, wherein the reinforcing rail comprises a metal or a metal alloy, and has a material thickness of 0.2 mm to 1 mm.

8. The pane according to claim 1, wherein the connection cable has a length greater than 2 cm.

9. The pane according to claim 1, wherein the connection cable has a length greater than 3 cm.

10. The pane according to claim 1, wherein the connection cable has a length greater than 4 cm.

11. The pane according to claim 1, wherein the connection cable has a length greater than 5 cm.

12. The pane according to claim 1, wherein the connection cable with the stiffening element and the heat shrink tube independently maintains an arrangement angle (α) relative to a soldering surface of the connection element, the arrangement angle (α) being in a range from 30° to 60°.

13. The pane according to claim 1, wherein the connection cable has a plug on its end away from the connection element.

14. The pane according to claim 1, wherein a difference between a coefficient of thermal expansion of the substrate and a coefficient of thermal expansion of the connection element is less than $5 \times 10^{-6}$/° C.

15. The pane according to claim 1, wherein the substrate comprises glass.

16. The pane according to claim 1, wherein the substrate comprises soda lime glass.

17. The pane according to claim 1, wherein the connection element comprises an iron-containing alloy.

18. The pane according to claim 1, wherein the connection element comprises a chromium-containing steel.

19. The pane according to claim 1, wherein the soldering compound is lead-free.

20. The pane according to claim 1, wherein the electrically conductive structure comprises silver and has a layer thickness of 5 μm to 40 μm.

21. The pane according to claim 1, wherein the electrically conductive structure comprises silver particles and glass frits and has a layer thickness of 5 μm to 40 μm.

22. An arrangement comprising the pane according to claim 1, the arrangement being selected from a group consisting of: buildings, means of transportation for travel on land, in the air, or on water, rail vehicles or motor vehicles, a windshield, rear window, side window, roof panel, heatable pane or pane with an antenna function.

23. A method for producing a pane with an electrical connection element, comprising:
   providing a substrate being a pane;
   applying an electrically conductive structure on a portion of the substrate;
   connecting a connection element by applying a soldering compound to the electrically conductive structure with energy input;
   connecting a flexible connection cable to the connection element; and
   enshrouding the flexible connection cable with a stiffening element being a heat shrink tube,
      wherein the stiffening element has a length of at least 80% of the length of the connection cable.

24. A pane with an electrical connection element and a connection cable, comprising:
   a substrate;
   an electrically conductive structure on a portion of the substrate;
   a connection element connected via a soldering compound with the electrically conductive structure; and a flexible connection cable connected with the connection element,
- wherein the connection cable is provided with a stiffening element and the connection cable with the stiffening element is enshrouded by a heat shrink tube, and
- wherein the connection cable is a stranded wire conductor implemented a round cable and the stiffening element is an insulating sheath.

* * * * *